(12) United States Patent
Heo et al.

(10) Patent No.: US 7,750,624 B2
(45) Date of Patent: Jul. 6, 2010

(54) ELECTRONIC SHIFT LEVER ASSEMBLY

(75) Inventors: Chun-nyung Heo, Gyeongsan-si (KR);
Yong-eon Jung, Gyeongsan-si (KR);
Hea-seok Song, Gyeongsan-si (KR)

(73) Assignee: SL Corporation, Daegu (KR)

( * ) Notice: Subject to any disclaimer, the term of this patent is extended or adjusted under 35 U.S.C. 154(b) by 305 days.

(21) Appl. No.: 11/840,274

(22) Filed: Aug. 17, 2007

(65) Prior Publication Data
US 2008/0042644 A1 Feb. 21, 2008

(30) Foreign Application Priority Data
Aug. 17, 2006 (KR) .................. 10-2006-0077863

(51) Int. Cl.
*G01B 7/14* (2006.01)
*B60K 17/12* (2006.01)

(52) U.S. Cl. .................. 324/207.23; 74/473.12

(58) Field of Classification Search .......... 324/207.2, 324/207.22, 207.23, 207.24, 207.25; 345/161; 74/335, 473.1, 473.12, 473 XY; 341/15
See application file for complete search history.

(56) References Cited

U.S. PATENT DOCUMENTS

| 3,453,614 | A  | * | 7/1969 | Bose ........................... 341/9 |
| 6,201,389 | B1 | * | 3/2001 | Apel et al. ............... 324/207.2 |
| 6,530,293 | B1 |   | 3/2003 | Ruckert et al. |
| 6,550,351 | B1 | * | 4/2003 | O'Reilly et al. ............. 74/335 |
| 6,923,083 | B2 | * | 8/2005 | Fujinuma ................. 74/473.33 |
| 7,552,659 | B2 | * | 6/2009 | Komatsu et al. ............. 74/335 |

* cited by examiner

*Primary Examiner*—Kenneth J Whittington
(74) *Attorney, Agent, or Firm*—Edwards Angell Palmer & Dodge LLP; Kongsik Kim

(57) ABSTRACT

An electronic shift lever assembly can select a gear position by sensing the movement of a shift lever in forward, backward, fight and left directions. The electronic shift lever assembly includes: a shift lever movable to select a gear position; a first sensor unit comprising a plurality of linear hall sensors for sensing vertical movement of the shift lever; and a second sensor unit comprising a plurality of switch hall sensors for sensing horizontal movement of the shift lever.

10 Claims, 21 Drawing Sheets great ELECTRONIC SHIFT LEVER ASSEMBLY

CROSS-REFERENCE TO RELATED APPLICATION

This application claims priority from Korean Patent Application No. 10-2006-0077863 filed on Aug. 17, 2006, the disclosure of which is incorporated herein by reference in its entirety.

BACKGROUND OF THE INVENTION

1. Technical Field

The present invention relates to an electronic shift lever assembly, and more particularly, to an electronic shift lever assembly which can select a gear position by sensing the movement of a shift lever in forward, backward, right and left directions using hall sensors.

2. Background Art

A vehicle transmission changes gear ratio according to vehicle speed so that engine can rotate at a constant speed. The gear ratio can be changed by manipulation of the shift lever of the transmission. The transmission is generally classified into a manual transmission in which gear position is manually changed by a driver and an automatic transmission in which gear position is changed automatically according to vehicle speed when a driver selects a drive (D) mode.

In addition, a "sports mode" transmission, which can manually and automatically changes the gear position, is used. That is, a manual transmission which allows a driver to manually change the gear position to a higher or lower gear position while driving in automatic transmission mode can be provided along with an automatic transmission.

A driver may select one of the gear positions of an electronic transmission, such as park (P), reverse (R), neutral (N), drive (D), and '2' and '1' gears at which engine brake can be applied. There have been attempts to apply a hall sensor, which uses a magnet, to select one of the gear positions. Since the hall sensor can convert a magnetic force into an electrical signal, it senses the selected gear position using the electrical signal. That is, the position of the shift lever can be identified using an electrical signal, mainly a voltage, sensed by the hall sensor.

Conventional systems for sensing the position of a shift lever using a hall sensor are disclosed in U.S. Pat. Nos. 6,550,351 and 6,305,075.

The conventional systems use a linear hall sensor or a switch hall sensor to sense the position of the shift lever which moves in one direction. However, it is difficult to effectively apply the linear hall sensor or the switch hall sensor when the shift lever moves not only in linear path but also in complicated paths.

In addition, a separate sensor unit must be installed at each shift position (P, R, N or D) and each select position (+, −) in order to sense each of the shift and select positions. Consequently, the structures of the conventional systems become complicated, causing high manufacturing costs.

Moreover, since the conventional automatic gear transmissions, which drive manual valve using cable tension as the position of the shift lever is adjusted by a driver, driving mode can be incorrectly selected when the driver makes a mistake while driving or is inexperienced in manipulating the shift lever.

Furthermore, the driver may not able to select a desired mode due to aging of the cable, and fuel efficiency may decrease by heavy weight of vehicle parts.

Also, the conventional automatic gear transmissions, generally, have a large size so as to cause the utilization of vehicle space to be limited.

SUMMARY OF THE INVENTION

In one aspect, the present invention provides an electronic shift lever assembly which comprises a shift lever and a sensor unit. The shift lever is designed to be able to move so as to select a gear position. The sensor unit includes magnets, a magnet holder, and a plurality of linear hall sensors. The magnets are arranged, preferably, in a cylindrical-shape. The magnets are attached to the magnet holder. The plurality of linear hall sensors detect rotation of the magnets, which is induced by movement of the magnet holder, thereby sensing movement of the shift lever in a shift direction.

In a preferred embodiment, the linear hall sensors lie on the opposite side of the magnets, and the magnets having a north (N) pole and a south (S) pole are contiguous to another magnet.

In another preferred embodiment, the sensor unit further comprises a printed circuit board having the linear hall sensors mounted thereon and receiving signals from the linear hall sensors.

In another aspect, the present invention provides an electronic shift lever assembly which comprises: a shift lever designed to be able to move so as to select a gear position; a first sensor unit comprising a plurality of linear hall sensors for sensing vertical movement of the shift lever; and a second sensor unit comprising a plurality of switch hall sensors for sensing horizontal movement of the shift lever.

In a preferred embodiment, the first sensor unit may comprise magnets arranged in a cylindrical-shape and a magnet holder to which the magnets are attached, wherein the plurality of linear hall sensors sense rotation of the magnets which is induced by movement of the magnet holder.

In another preferred embodiment, the linear hall sensors lie on the opposite side of the magnets, and the magnets having a north (N) pole and a south (S) pole are contiguous to another magnet.

In still another preferred embodiment, the first sensor unit may further comprise a printed circuit board (PCB) having the linear hall sensors mounted thereon and receiving signals from the linear hall sensors.

In yet another preferred embodiment, the second sensor unit comprises a magnet having a magnetization pattern and a magnet holder fixing the magnetization pattern magnet, wherein the plurality of switch hall sensors sense vertical movement of the magnetization pattern magnet, which is induced by movement of the magnetization magnet holder and output a bit combination. Preferably, if the magnetization pattern magnet is comprised of three layers, each layer may have a magnetization pattern comprised of N and S poles. Also preferably, a region in a diagonal direction of the magnetization pattern may be comprised of the N pole, and other regions may be comprised of the S pole.

In a further preferred embodiment, the magnetization pattern may be comprised of a plurality of layers and further comprise a buffer zone of the N or S pole in a region, in which polarity is changed, between the layers.

In yet a further preferred embodiment, the second sensor unit may further comprise a PCB having the switch hall sensors mounted thereon and receiving signals from the switch hall sensors.

In a still further embodiment, a position of the shift lever is determined based on combination of signals sensed by the first sensor unit and the second sensor unit.

In yet a still further embodiment, the shift lever may comprise: a rod forming a body of the shift lever and rotating about the shift axis and the select axis; a knob connected to the rod and functioning as a handle; a shift guide guiding the shift lever so as to rotate about the shift axis; and a select guide guiding the shift lever so as to rotate about the select axis. Preferably, the shift lever may further comprise a detent bullet keeping the shift lever substantially vertical and an elastic member pushing the detent bullet downward so as to return the shift lever to a null position.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
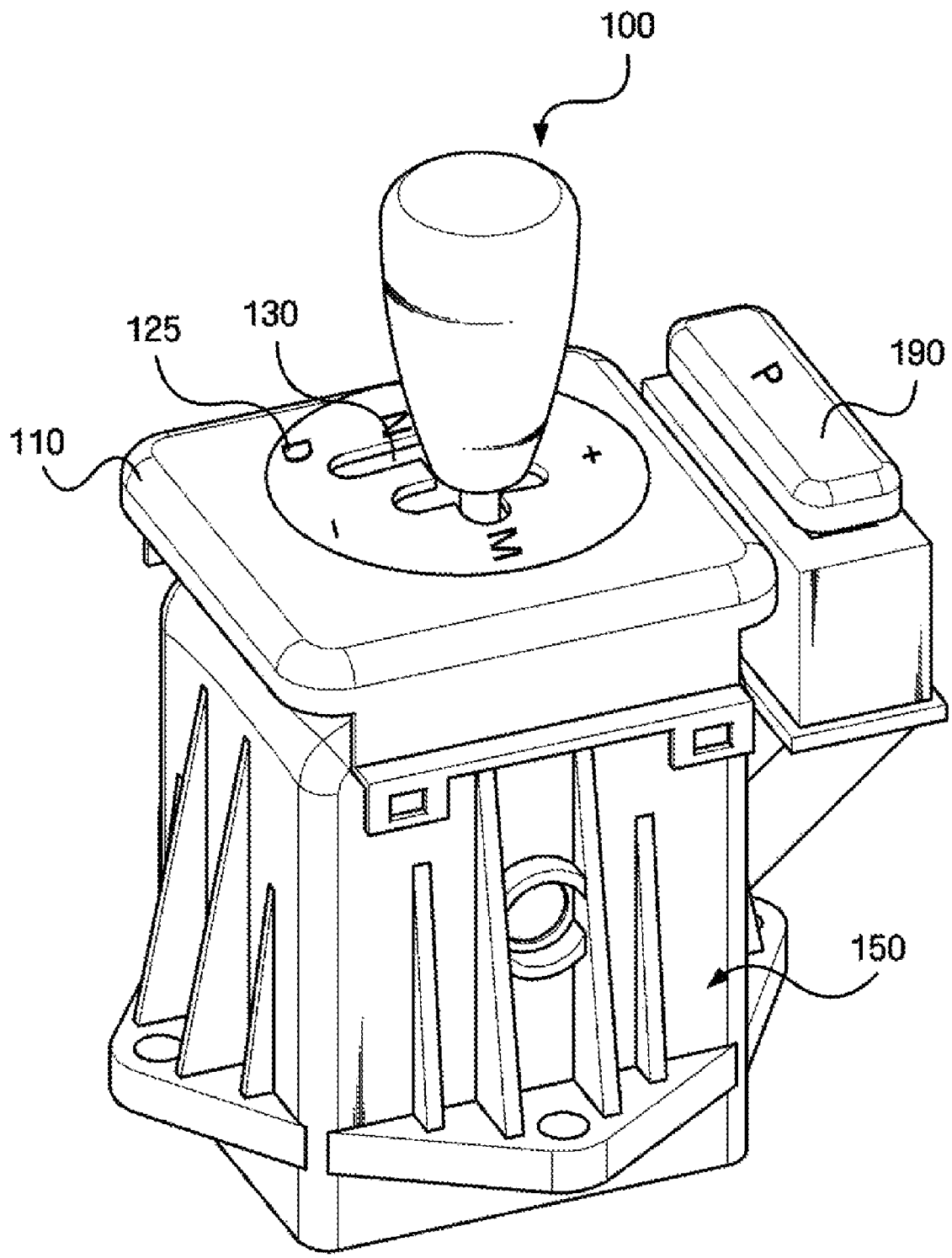
FIG. 1 is a perspective view of an electronic shift lever assembly according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. Like reference numerals in the drawings denote like elements, and thus their description will be omitted.

Hereinafter, exemplary embodiments of the present invention will be described in detail with reference to the accompanying drawings.

Figure 2:
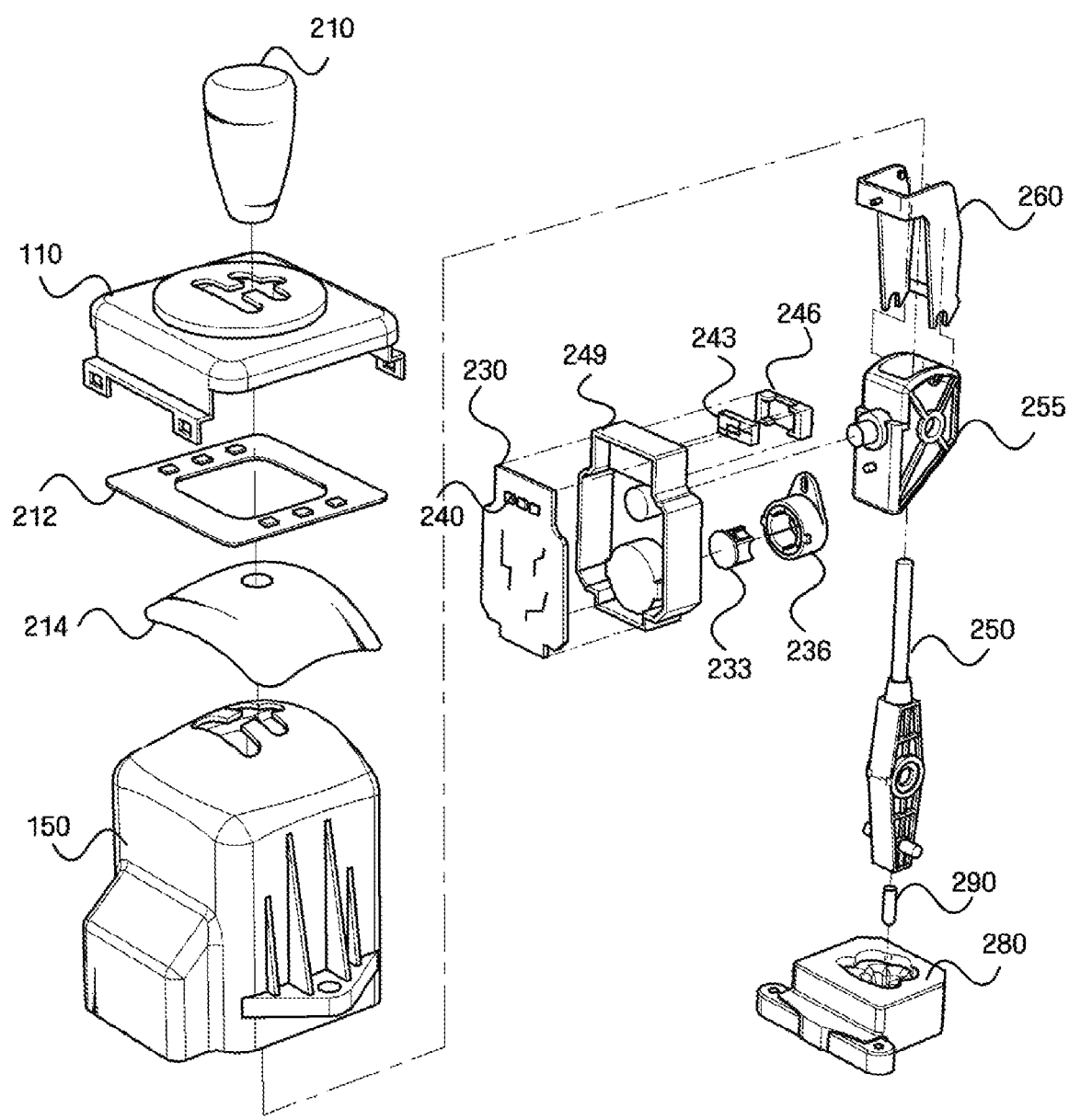
FIG. 2 is an assembly view of the electronic shift lever assembly of FIG. 1.

FIG. 1 is a perspective view of an electronic shift lever assembly using hall sensors according to an exemplary embodiment of the present invention. FIG. 2 is an assembly view of the electronic shift lever assembly of FIG. 1.

Referring to FIG. 1, the electronic shift lever assembly according to a preferred embodiment of the present invention includes a shift lever 100, an indicator 110, a base bracket 150, a first sensor unit, and a second sensor unit.

The indicator 110 indicates a gear position 125 to which a current gear position is to be shifted. In addition, the indicator 110 may provide a passage 130 through which the shift lever 100 can move. The indicator 110 may include an indicator cover and housing. Preferably, the indicator cover and the housing may be integrally formed. Also preferably, they may be formed separately. According to embodiments of the present invention, the passage 130 may have ⊬, ⊬, ⊬, ⊬and/or ⊬shapes. That is, the passage 130 may have one of these shapes as the shift lever 100 moves along horizontal and vertical paths.

Figure 3:
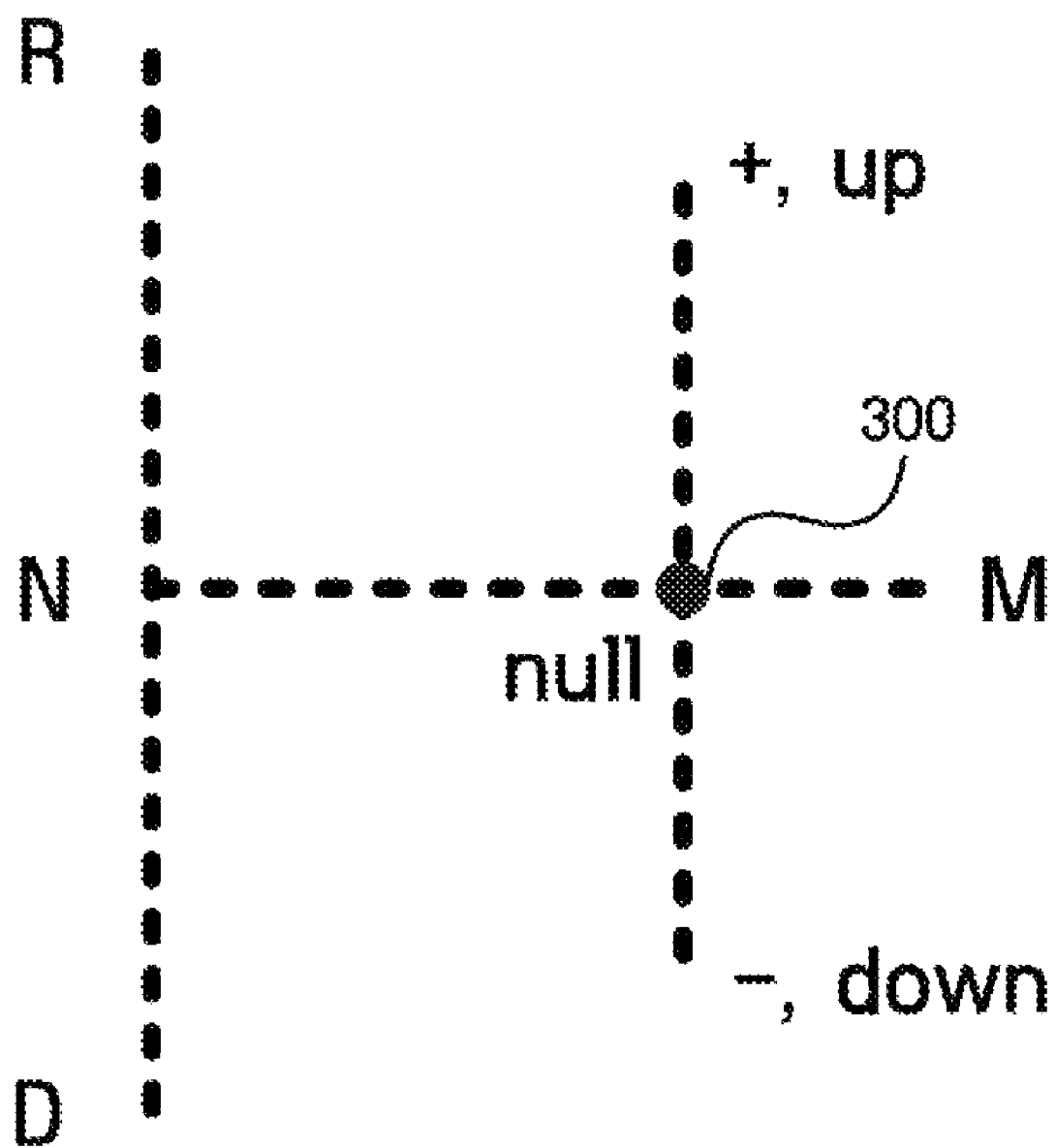
FIG. 3 illustrates gear positions displayed on an indicator which has a passage of a ⊬shape according to an exemplary embodiment of the present invention.

FIG. 3 illustrates gear positions displayed on the indicator 110 which has the passage 130 of the ⊬shape according to an exemplary embodiment of the present invention. Referring to FIG. 3, the indicator 110 may display reverse (R), neutral (N) and drive (D) positions in a vertical line on the left thereof and display up (+) (to a higher position) and down (−) (to a lower position), which are manual transmission menu items, in a vertical line in the middle thereof. In addition, the indicator 110 may display a manual mode (M) on the right thereof when a transmission mode is changed from an automatic transmission mode to a manual transmission mode. If the passage 130 has the ⊬or ⊬shape, M may be displayed elsewhere. Although a park (P) position is not shown in FIG. 3, it may be implemented through a little change in design or by adding another gear position. Alternatively, a P gearshift 190 may be attached next to the indicator 110 as illustrated in FIG. 1.

The indicator 110 having the passage 130 of the ⊬shape may have a null position 300 as a neutral position. If a user lets go of the shift lever 100 after selecting a gear position, the shift lever 100 may return to the null position 300.

Referring to FIG. 2, a light-emitting diode (LED) indicator unit 212 indicates the gear position 125 selected by a user so that the user can identify the selected gear position 125. Since the shift lever 100 returns to the null position 300 after finishing its operation, it is hard for the user to identify the selected gear position 125. The LED indicator unit 212 illuminates the gear position 125 selected by the user from gear positions of the indicator 110, which enables the user to identify the selected gear position 125.

A slide 214 enables the shift lever 100 to operate smoothly. The slide 214 blocks foreign matter from entering an indicator unit and covers the internal structure of the indicator 110. The slide 214 is disposed between the indicator 110 and the base bracket 150 and may have a hole, in which a rod of the shift lever 100 is placed, at the center thereof. Therefore, if the shift lever 100 is moved forward/backward and to the right/ left, the slide 214 moves accordingly. Consequently, a frictional force generated by the manipulation of the shift lever 100 can be reduced.

The base bracket 150 covers a lower part of the shift lever 100 and the first and second sensor units. That is, the base bracket 150 can protect a part sensing the gear position 125 selected by the movement of the shift lever 100. The base bracket 150 may include a groove 280 in a lower part thereof. For example, the groove 280 may form a passage through which a detent bullet 290 of the shift lever 100 can pass. The groove 280 may be shaped similar to the ⊬shape of the passage 130 of the indicator 110. In this case, the groove 280 may be cut deepest at the null position 300 and cut shallower as the distance from the null position 300 increases.

Figure 4:
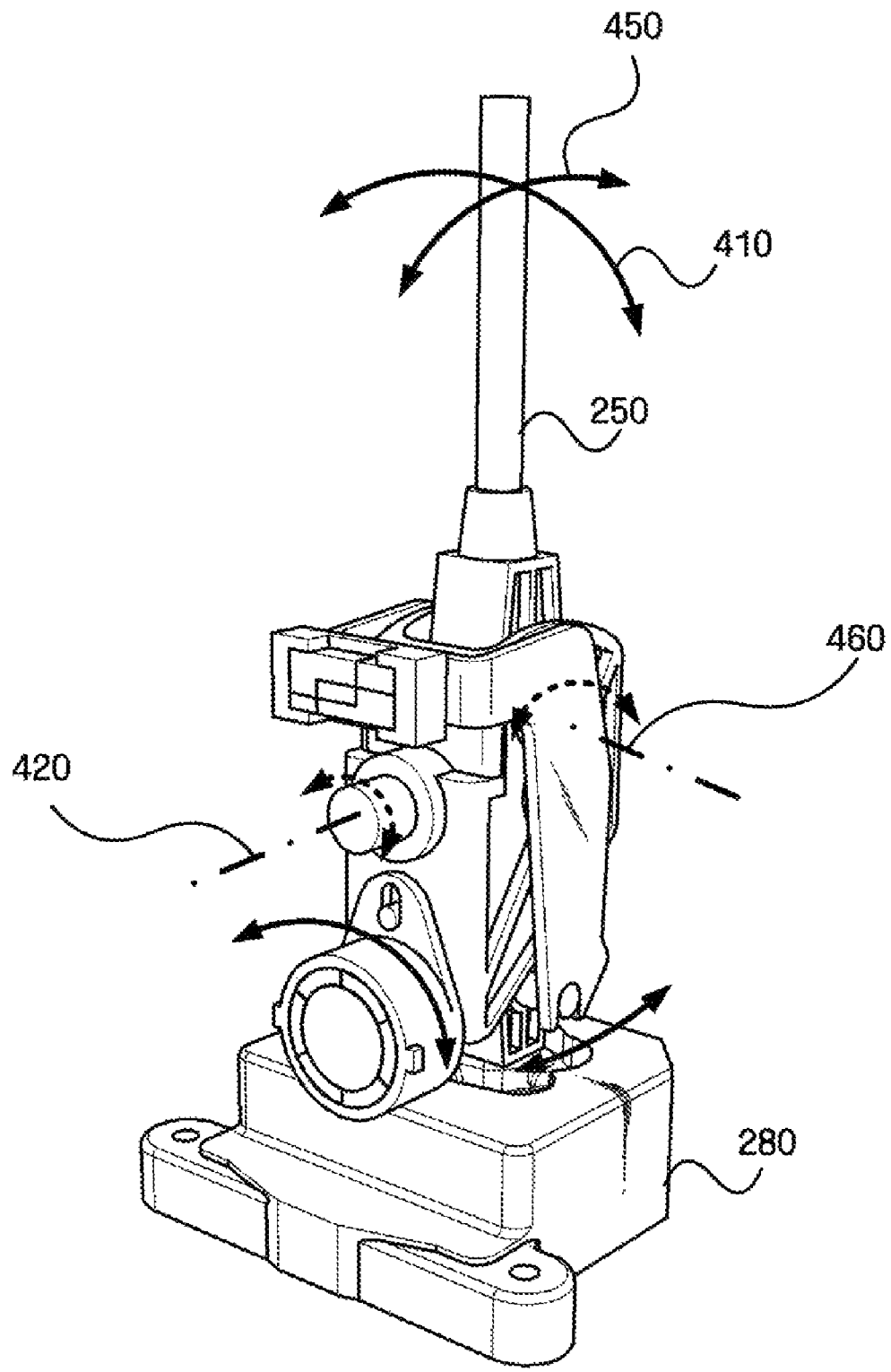
FIG. 4 is a perspective view illustrating the operation of a shift lever of the electronic shift lever assembly of FIG. 1.
Figure 5:
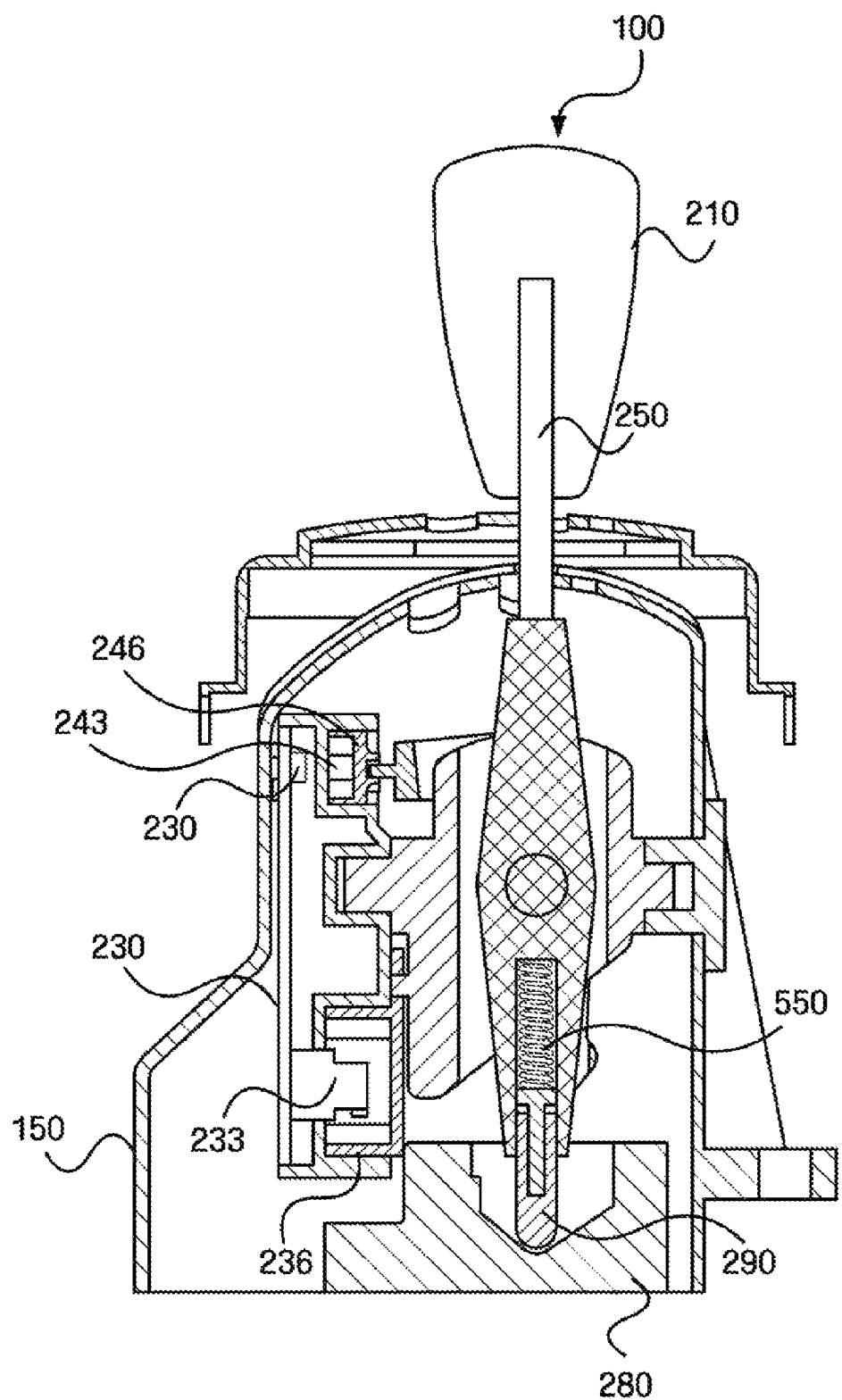
FIG. 5 is a lateral view of the electronic shift lever of FIG. 4.

FIG. 4 is a perspective view illustrating the operation of the shift lever 100 of the electronic shift lever assembly illustrated in FIG. 1. FIG. 5 is a lateral view of the electronic shift lever 100 illustrated in FIG. 4.

Referring to FIGS. 4 and 5, the shift lever 100 includes a rod 250, a knob 210, the detent bullet 290, a shift guide 255, and a select guide 260. Shaped like a long stick, the rod 250 may have a groove or a protrusion, which can engage each axis of rotation, on a side surface of a middle part thereof in order to rotate forward/backward and to the right/left within a predetermined range. Therefore, when a user pushes or pulls the knob 210 connected to the rod 250, the rod 250 may rotate about the axis of rotation.

The shift guide 255 becomes the center of rotation when the shift lever 100 rotates with respect to a shift axis 420. In addition, the select guide 260 guides the shift lever 100 to rotate with respect to a select axis 460.

In an embodiment of the present invention, the shift lever 100 may rotate about the shift axis 420 or the select axis 460 as illustrated in FIG. 4. The shift axis 420 is an axis of rotation about which the shift lever 100 is rotated to select one of the vertically arranged R, N and D positions or select up (+) or down (−) in the indicator 110 having the passage 130 of the ⊬shape in FIG. 3, for example. The select axis 460 is an axis of rotation about which the shift lever 100 is rotated to the right or left in order to select the M or N position. In an embodiment of the present invention, moving the shift lever 100 forward/backward or in a shift direction 410 may denote rotating the shift lever 100 about the shift axis 420, and moving the shift lever 100 to the left/right or in a select direction 450 may denote rotating the shift lever 100 about the select axis 460. Therefore, the shift lever 100 may be rotated about the shift axis 420 (moved up or down) in order to select the R or D position illustrated in FIG. 3. In addition, the shift lever 100 may be rotated about the select axis 460 (moved to the left or right) in order to select the M or N position illustrated in FIG. 3.

The knob 210 serves as a handle by which a user can move the shift lever 100. Since the knob 210 is connected to the rod 250, if the user moves the knob 210, the rod 250 connected to the knob 210 is also moved, thereby selecting one of gear positions.

The detent bullet 290 is disposed in the lower part of the shift lever 100 and contacts the groove 280. The shift lever 100 may return to the null position 300 by the detent bullet 290. The detent bullet 290 is connected to a central part of the rod 250 by a hole and may be pushed downward to the groove 280 by an elastic member 550 such as a spring. Therefore, the detent bullet 290 guides the shift lever 100 to move along the passage formed in the groove 280. When a user lets go of the shift lever 100, the shift lever 100 may return to a deepest part of the groove 280, which corresponds to the null position 300, by the elastic member 550.

Figure 6A:
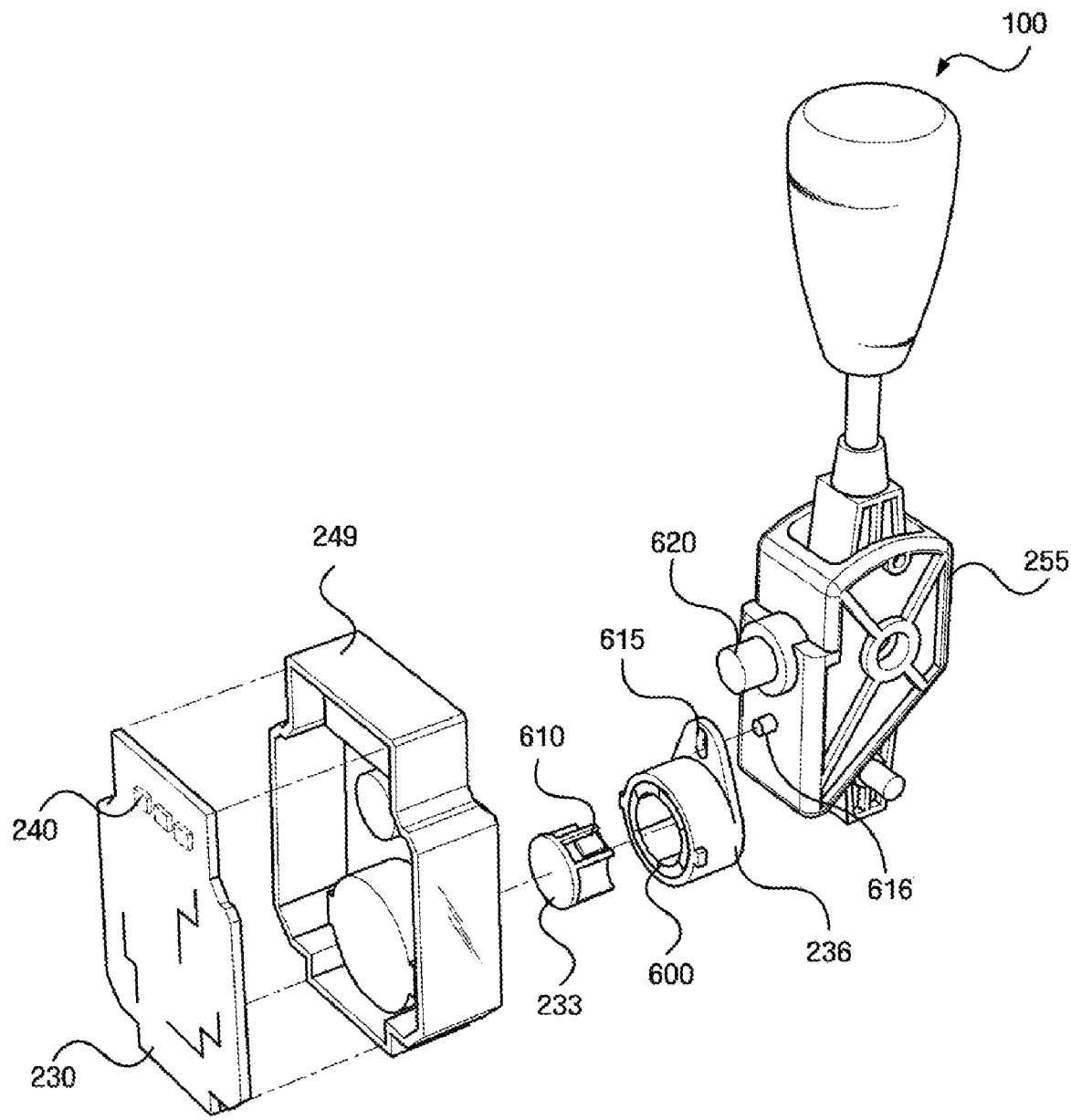
FIG. 6A is a perspective assembly view of a first sensor unit included in the electronic shift lever assembly of FIG. 1.

FIG. 6A is a perspective assembly view of the first sensor unit included in the electronic shift lever assembly of FIG. 1.

Referring to FIG. 6A, the first sensor unit may include a printed circuit board (PCB) 240, a sensor holder 233, a plurality of linear hall sensors 610, a plurality of magnets 600, a magnet holder 236, and the shift guide 255. The first sensor unit senses the rotation of the shift lever 100 with respect to the shift axis 420. Referring to FIG. 3, the first sensor unit senses the vertical (i.e. longitudinal) movement of the shift lever 100 for selecting the R or D position or the up (+) or down (−) position.

The PCB 240 converts a magnetic force sensed by the linear hall sensors 610 into an electrical signal. The sensor holder 233 having the linear hall sensors 610 mounted thereon is attached to the PCB 240. Therefore, the PCB 240 can sense signals generated by the linear hall sensors 610. Any circuit, which can convert signals generated by the linear hall sensors 610, can be used as the PCB 240 and perform the same functions as the PCB 240. The PCB 240 may be attached to a rear surface of a shaping plate 249 which is formed of a fixing member.

The liner hall sensors 610 are attached to the rim of the sensor holder 233 as illustrated in FIG. 6. For example, when the number of magnets 600 is three, the number of linear hall sensors 610 attached to the sensor holder 233 may be three. The linear hall sensors 610 respectively correspond to the magnets 600 and can sense a change in the magnetic force due to the movement of the magnets 600. Therefore, the movement of the magnets 600 can be sensed using one linear hall sensor. A plurality of the linear hall sensors 610 are implemented in case any one of the linear hall sensors 610 or magnets 600 breaks down or malfunctions. For example, when one of three sensors has a malfunction value which far exceeds a tolerance value, the other two sensors can sense the movement of magnets using sensed values.

The magnets 600 are attached to the magnet holder 236 and moved according to the movement of the magnet holder 236. The magnets 600 may be arranged in a cylindrical form. In this case, the north (N) pole of each of the magnets 600 faces the south (S) pole of another magnet. Generally, the magnets 600 are identical and generate the same magnetic force according to distance. However, when behavior characteristics of the linear hall sensors 610 for the corresponding magnets 600 are identified, even if the magnets 600 are different from one another, the position of the shift lever 100 can be obtained by reading a value sensed by each of the linear hall sensors 610. Each of the magnets 600 has the N and S poles. When the magnets 600 are attached to the magnet holder 236, they may be combined to form a cylindrical shape.

The magnet holder 236 has the magnets 600 attached thereto and is moved according to the movement of the shift lever 100. The magnets 600 are attached to edges of the magnet holder 236 in a circular form, and a groove 615 of the magnet holder 236 engages a protrusion 616 of the shift guide 255 such that the magnet holder 236 can be moved according to the movement of the shift guide 255. Accordingly, the magnets 600 attached to the magnet holder 236 can be moved.

The shift guide 255 surrounds the rod 250 of the shift lever 100 and has an axis protrusion 620 or a groove to allow the shift lever 100 to rotate about the shift axis 420. The shift guide 255 has a protrusion 616 in a lower part thereof. The protrusion 616 engages the groove 615 of the magnet holder 236 such that the magnet holder 236 can be moved according to the movement of the shift guide 255.

Figure 6B:
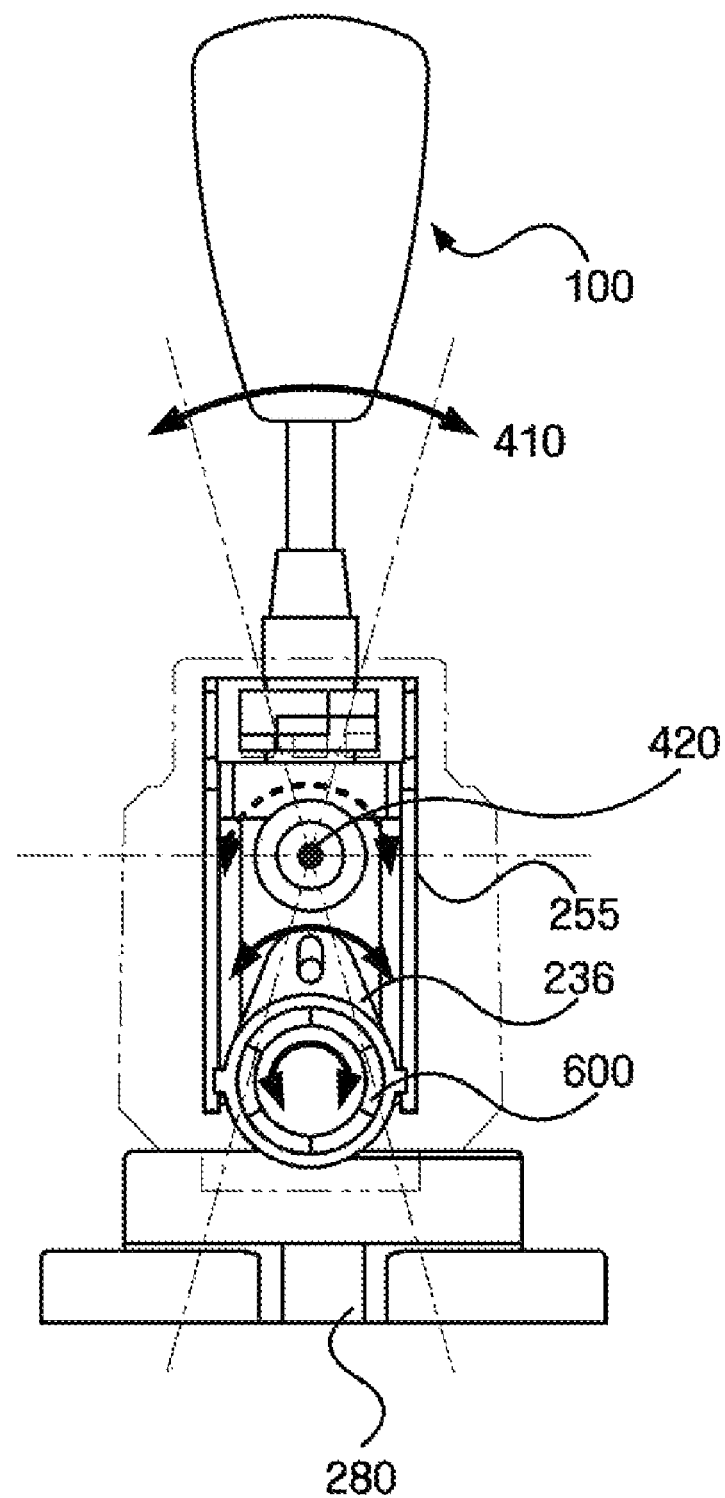
FIG. 6B illustrates the operation of the first sensor unit illustrated in FIG. 6A.

FIG. 6B illustrates the operation of the first sensor unit illustrated in FIG. 6A.

When the shift lever 100 is moved in the shift direction 410, it can rotate about the shift axis 420 of the shift guide 255. As the shift lever 100 rotates, the shift guide 255 may also be rotated, and the magnet holder 236 engaged with the shift guide 255 may also be moved. The groove 615 of the magnet holder 236 connected to the shift guide 255 moves along an arc or a part of a circle. Accordingly, the magnets 600 attached to the magnet holder 236 can be rotated. The linear hall sensors 610 are placed in a central part of the magnet holder 236 to correspond to the magnets 600, respectively. Since the linear hall sensors 610 are attached and thus fixed to the PCB 240 behind them, if the groove 615 of the magnet holder 236 moves, the magnets 600 arranged in the cylindrical form may rotate around the linear hall sensors 610.

Figure 7A:
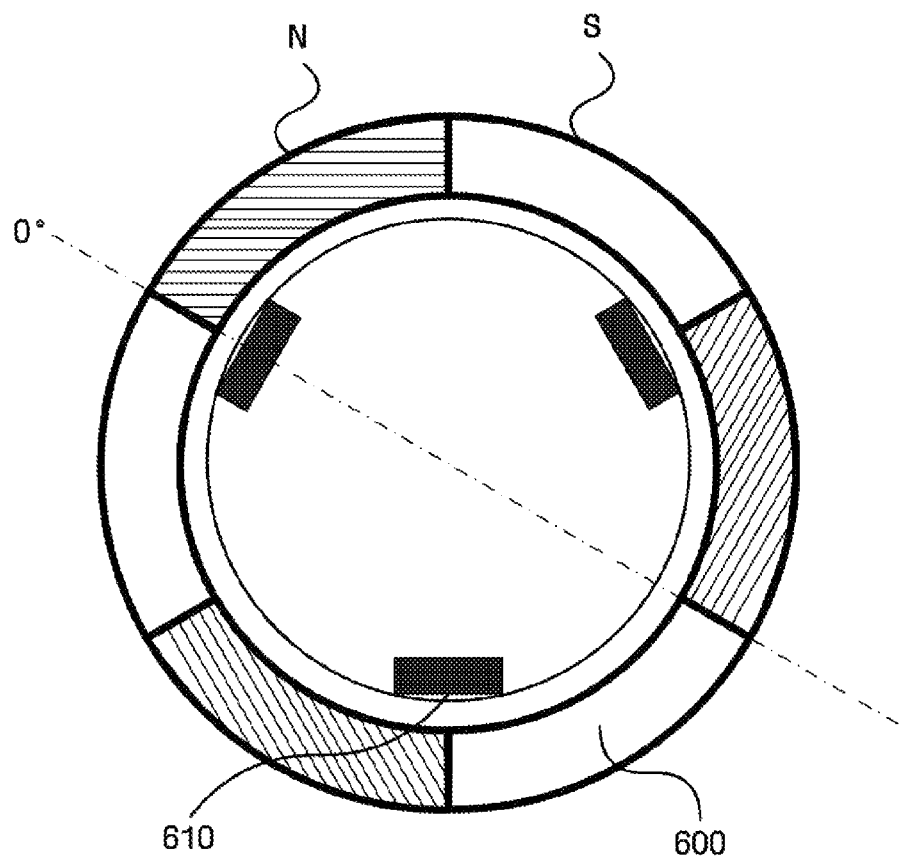
FIG. 7A is a cross-sectional view of magnets and linear hall sensors included in the first sensor unit of FIG. 6A.
Figure 7B:
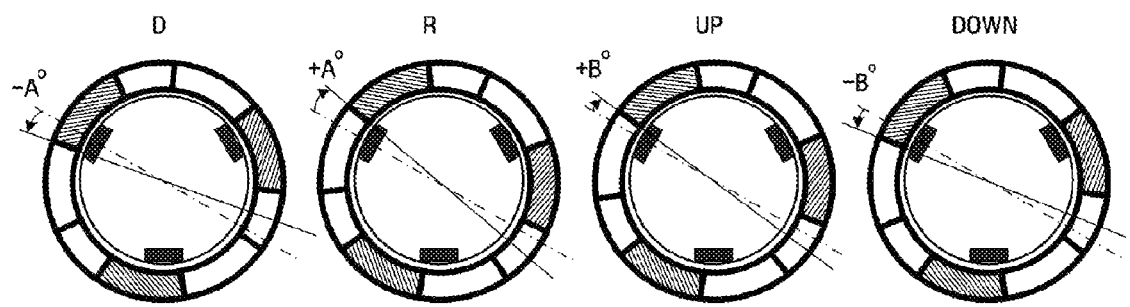
FIG. 7B illustrates angles between the magnets and the linear hall sensors of the first sensor unit which are created by the rotation of the magnets according to an exemplary embodiment of the present invention.
Figure 7C:
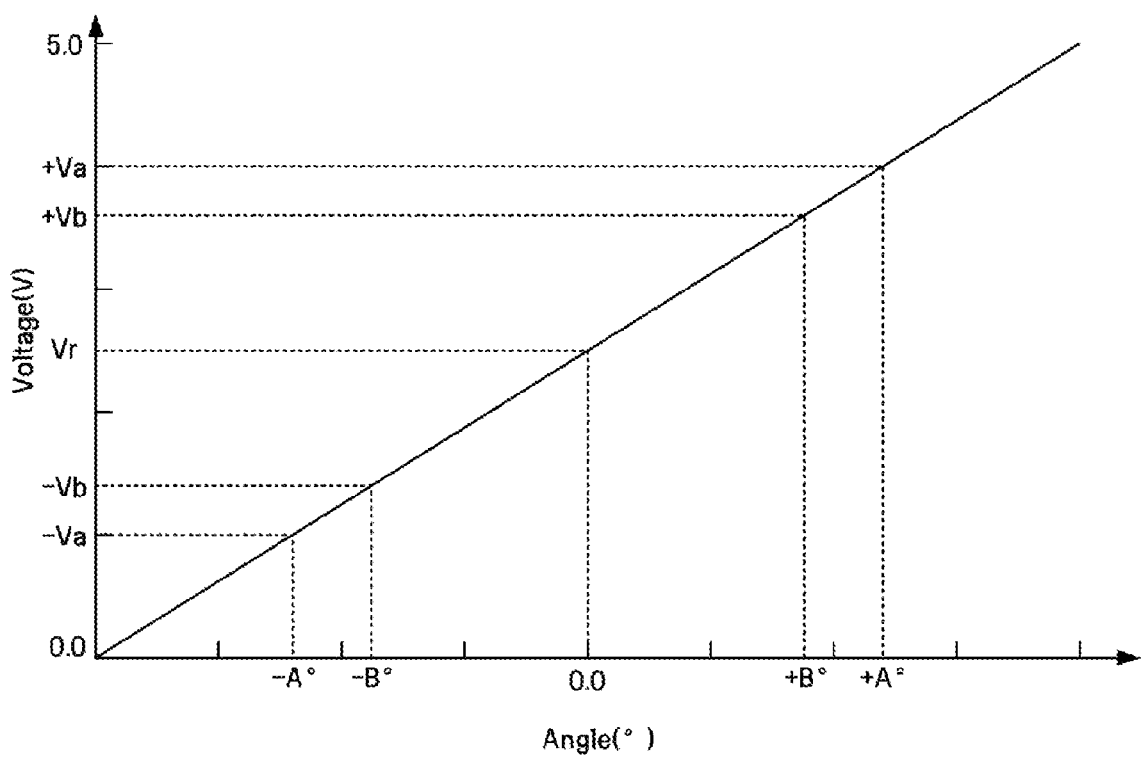
FIG. 7C is a graph showing the size of a voltage sensed by the linear hall sensors according to an angle difference between the magnets and the linear hall sensors in illustrated in FIG. 7B.

FIG. 7A is a cross-sectional view of the magnets 600 and the linear hall sensors 610 included in the first sensor unit of FIG. 6A. FIG. 7B illustrates angles between the magnets 600 and the linear hall sensors 610 of the first sensor unit which are created by the rotation of the magnets 600 according to an exemplary embodiment of the present invention. FIG. 7C is a graph showing the size of a voltage sensed by the linear hall sensors 610 according to an angle difference between the magnets 600 and the linear hall sensors 610 in illustrated in FIG. 7B.

Referring to FIG. 7A, if the shift lever 100 is in the null position 300, an angle between the magnets 600 and the linear hall sensors 610 is zero. In this case, no force is sensed by the linear hall sensors 610. However, since the magnets 600 are rotated as the magnet holder 236 moves, there may occur an angle difference between the rotated magnets 600 and the fixed linear hall sensors 610. Accordingly, the linear hall sensors 610 can sense a magnetic force which is proportionate to the angle difference.

Referring to FIG. 7B, when the shift lever 100 is rotated about the shift axis 420 to select a gear position, an angle between the magnets 600 and the linear hall sensors 610 can be identified in advance. For example, if the passage 130 of the indicator 110 has the ⵜshape, the shift lever 100 moves to the up (+) position less than to the R position with respect to the shift axis 420. Therefore, an angle between the magnets 600 and the linear hall sensors 610 at the R position may be relatively greater than that at the up (+) position. If the passage 130 of the indicator 110 has the ⵜshape, the angle between the magnets 600 and the linear hall sensors 610 may be +A degrees at the R position, −A degrees at the D position, +B degrees at the up (+) position, and −B degrees at the down (−) position. The angle between the magnets 600 and the linear hall sensors 610 may vary according to the number of magnets, the length of the shift lever 100, and the amount of rotation of the shift lever 100 with respect to the shift axis 420.

If the passage 130 of the shift lever 100 has the ⵜshape, the angle between the magnets 600 and the linear hall sensors 610 at the up (+) position may be greater than that at the R position. The angles illustrated in FIG. 7B are examples only for the purpose of illustration of the present invention. When there is a plurality of vertical gear positions, each of the vertical gear positions can be sensed by varying the amount of rotation of the shift lever 100 to each gear position with respect to the shift axis 420.

Figure 8A:
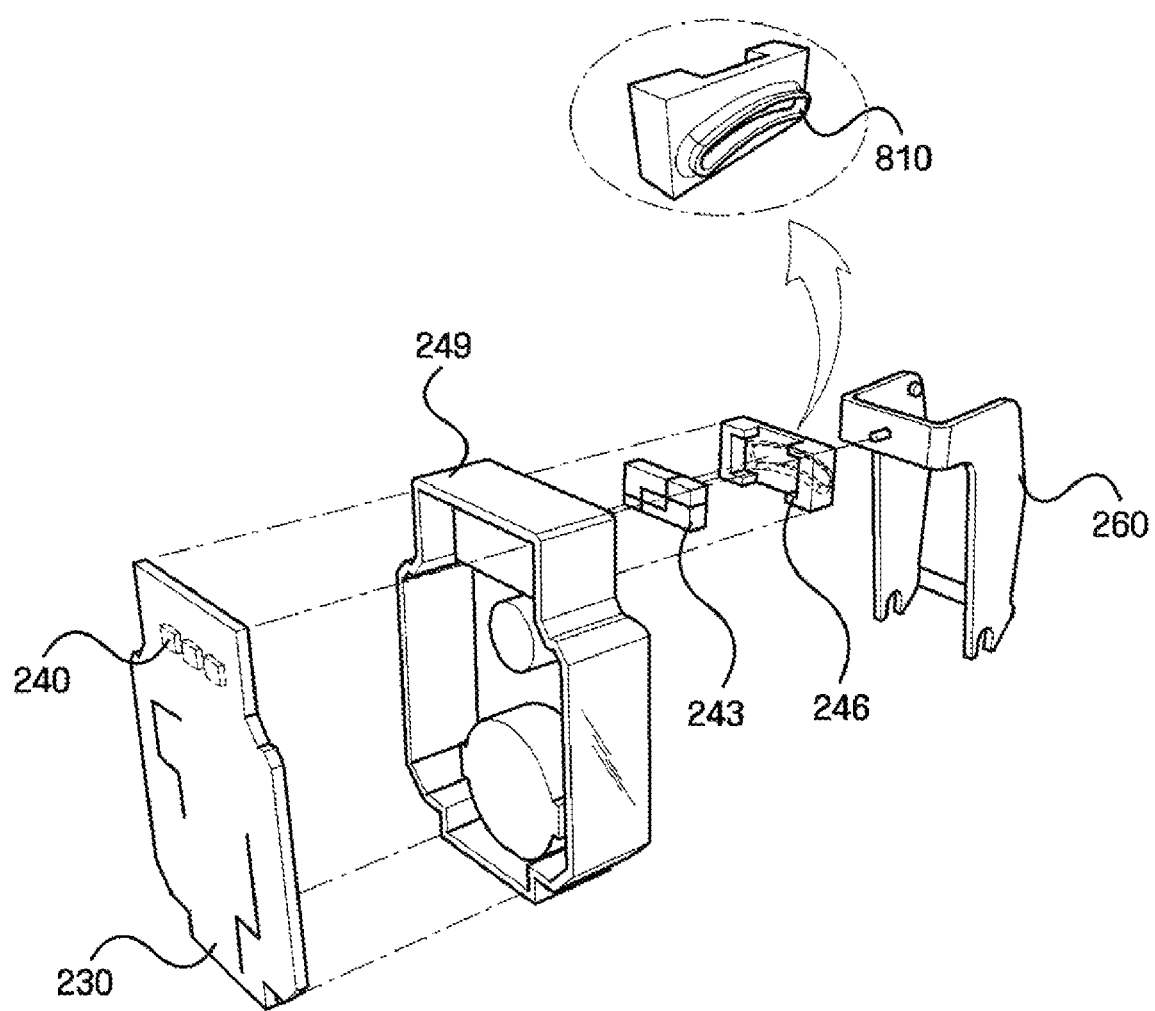
FIG. 8A is a perspective assembly view of a second sensor unit included in the electronic shift lever assembly of FIG. 1.
Figure 8B:
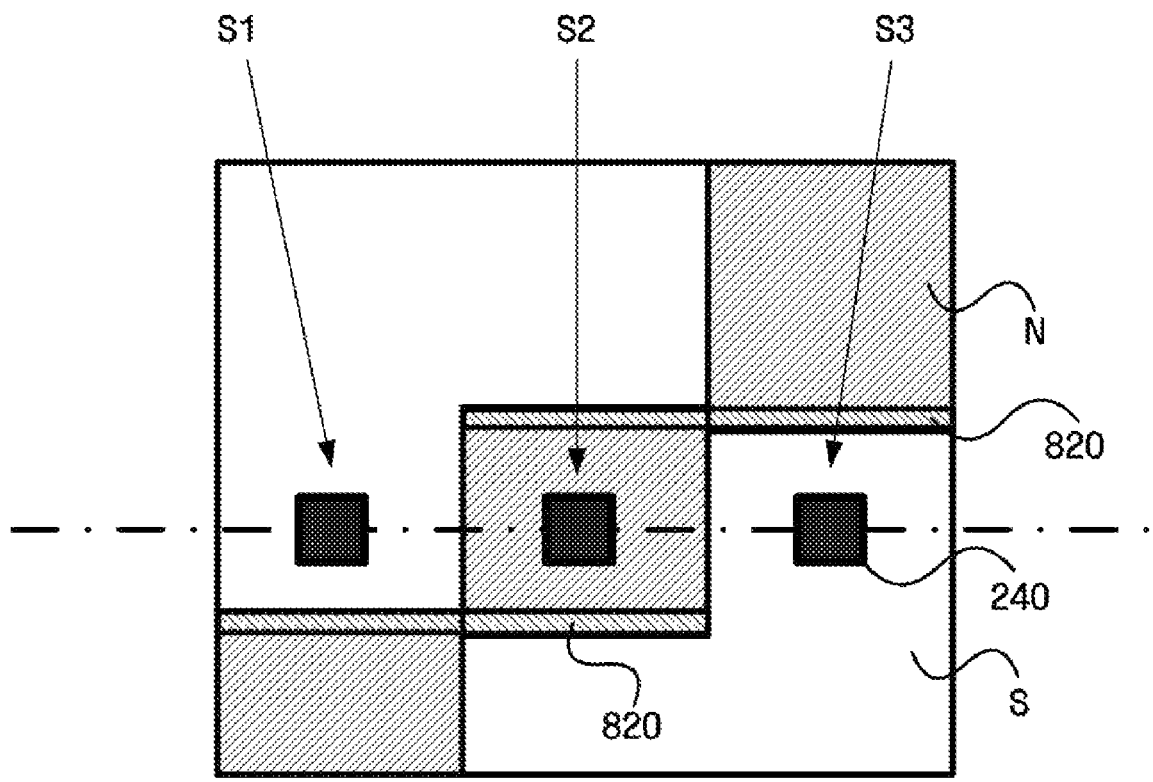
FIG. 8B illustrates an example of a magnetization pattern of a magnetization pattern magnet included in the second sensor unit of FIG. 8A.

The linear hall sensors 610 convert into a voltage a magnetic force which has been generated by an angle formed between the magnets 600 and the hall sensors 610 due to the movement of the shift lever 100, and FIG. 7C shows the voltage. At an angle of zero degree, no magnetic force is generated. Therefore, a voltage level may be zero. If the magnetic force is an attractive force or a repulsive force, a voltage for one of the attractive and repulsive forces may have a negative value. Since it may not be easy to process the negative value, the overall voltage level may be increased to a predetermined voltage level so that all voltages can have positive values. The level of an output voltage may be in proportion to an angle difference between the magnets 600 and the hall sensors 610. The voltages may have a predetermined tolerance range FIG. 8A is a perspective assembly view of the second sensor unit included in the electronic shift lever assembly illustrated in FIG. 1. FIG. 8B illustrates an example of a magnetization pattern of a magnetization pattern magnet 243 included in the second sensor unit of FIG. 8B.

The second sensor unit includes a PCB 230, the magnetization pattern magnet 243, a plurality of switch hall sensors 240, a magnetization magnet holder 246, and the select guide 260. The second sensor unit senses the rotation of the shift lever 100 with respect to the select axis 460. Referring to FIG. 3, for example, the second sensor unit senses the horizontal movement of the shift lever 100 for selecting the N or M position.

The PCB 230 is identical to the PCB 240 used by the first sensor unit described above and can receive signals generated by the linear hall sensors 610 and the switch hall sensors 240. That is, the PCB 230 receives not only signals generated by the linear hall sensors 610 of the first sensor unit but also signals generated by the switch hall sensors 240 of the second sensor unit.

The magnetization pattern magnet 243 artificially gives polarity to a predetermined region. Therefore, if a predetermined pattern is formed in the magnetization pattern magnet 243 and then recognized, several combinations of signals can be created. Referring to FIG. 8B, a region in a diagonal direction of the magnetization pattern magnet 243 may be magnetized with the N pole, and other regions may be magnetized with the S pole. Such a magnetization pattern is an example shown only for the purpose of illustration, and various magnetization patterns can be created if a combination of signals that can be sensed at each layer of the magnetization pattern magnet 243 is different.

The switch hall sensors 240 may be, for example, three sensors arranged in a linear form and may be attached to the PCB 230. The switch hall sensors 240 sense a magnetic force and output a voltage. For example, the switch hall sensors 240 may output a high voltage in the case of the N pole and a low voltage in the case of the S pole.

The PCB 230 senses a voltage output from the switch hall sensors 240 and generates a bit by assigning zero to a low voltage range and one to a high voltage range. Accordingly, the switch hall sensors 230 generate a bit combination based on an output voltage according to a magnetization pattern recognized at the same height as the magnetization pattern magnet 243. For example, if the shift lever 100 is placed in the null position 300 as illustrated in FIG. 8B, the switch hall sensors 230 may display (0,1,0), where 1 indicates the N pole, and 0 indicates the S pole. Alternatively, 1 may indicate the S pole, and 0 may indicate the S pole.

The magnetization magnet holder 246 has the magnetization pattern magnet 243 attached thereto. The magnetization magnet holder 246 may be moved according to the movement of the shift lever 100, and the magnetization pattern magnet 243 may be moved according to the movement of the magnetization magnet holder 246. The magnetization pattern magnet 243 is mounted on a front surface of the magnetization magnet holder 246, and a coupling unit 810 having a groove connected to the select guide 260 may be mounted on a rear surface of the magnetization magnet holder 246. The groove formed in the coupling unit 810 extends horizontally and prevents the magnetization pattern magnet 243 from moving up or down when the shift lever 100 is rotated about the shift axis 420.

The select guide 260 guides the magnetization pattern magnet 243 to move up or down when the shift lever 100 is moved about the select axis 460. The select guide 260 surrounds the rod 250 of the shift lever 100 and is moved according the movement of the shift lever 100. After a central part of each of lower and upper parts of the select guide 260 is connected to the rod 250, if the shift lever 100 is moved in the select direction 450 along the groove 280 under the rod 250, the upper part of the select guide 260 can be moved up or down.

Figure 8C:
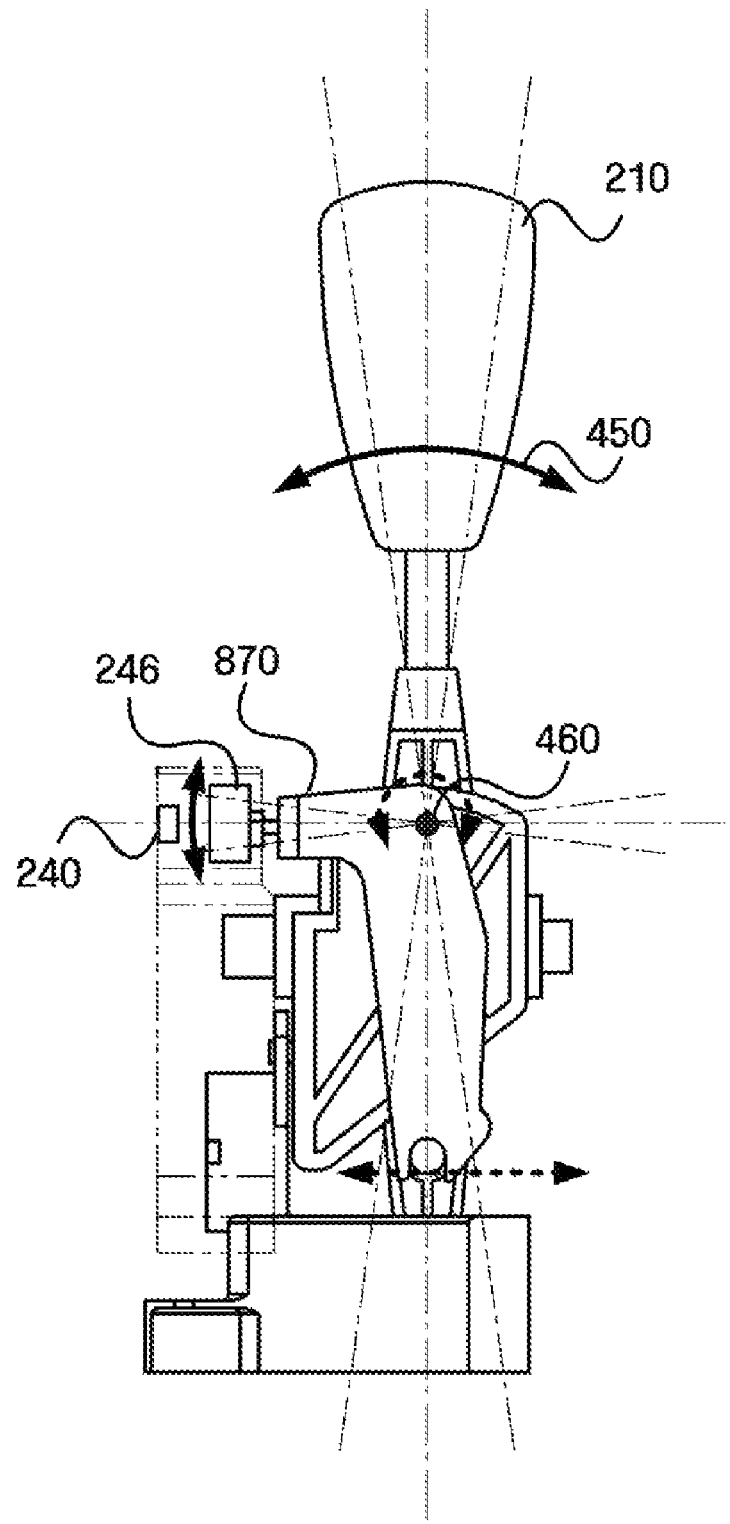
FIG. 8C illustrates the operation of the second sensor unit illustrated in FIG. 8A.
Figure 9A:
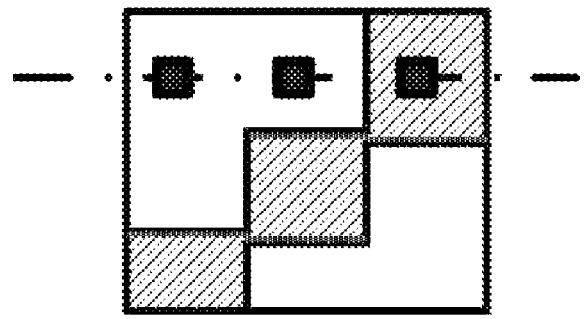
FIGS. 9A, 9B and 9C illustrates bit combinations recognized by switch hall sensors according to the movement of a magnetization pattern magnet included in the second sensor unit of FIG. 8A.
Figure 9B:
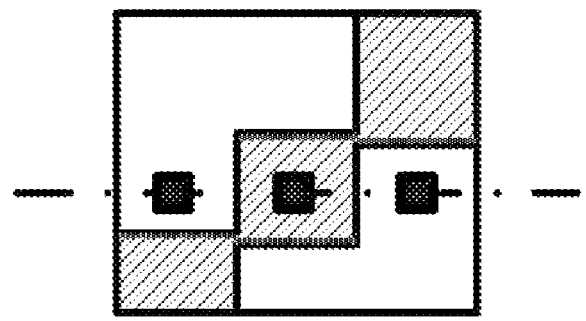
Figure 9C:
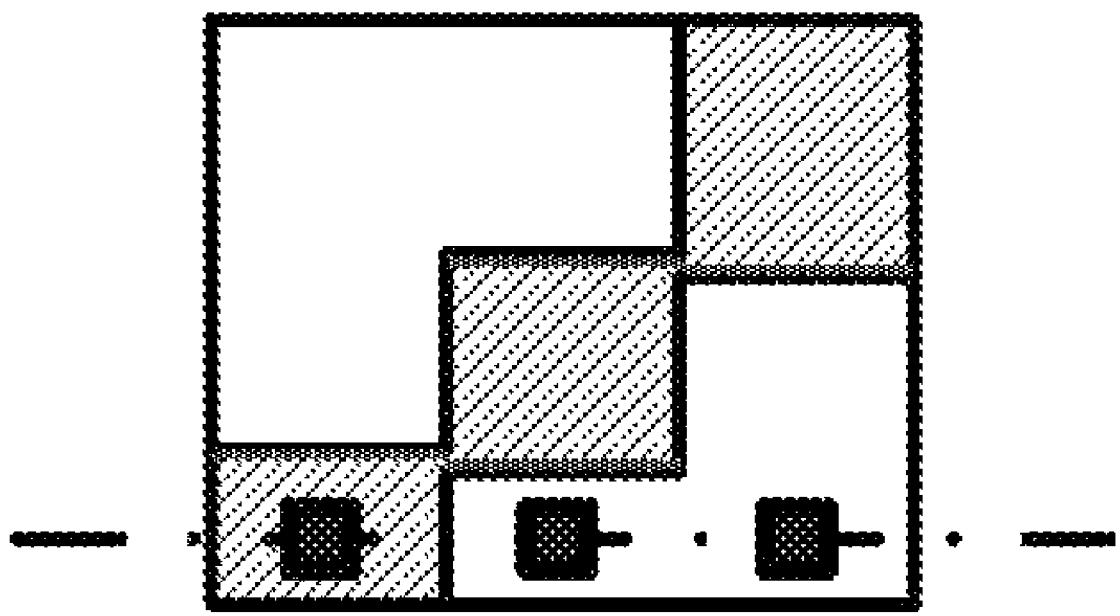

FIG. 8C illustrates the operation of the second sensor unit illustrated in FIG. 8A. FIGS. 9A, 9B and 9C illustrate bit combinations recognized by the switch hall sensors 240 according to the movement of the magnetization pattern magnet 243 included in the second sensor unit.

If an upper part of the shift lever 100 is moved to the left, the lower part of the shift lever 100 may be moved to the right. Accordingly, a lower part of the select guide 260 may be moved to the right, and a left part 870 of the select guide 260 may be moved downward with respect to an upper axis (the select axis 460) of the select guide 260. As the left part 870 of the select guide 260 moves downward, the magnetization magnet holder 246 connected to a protrusion of the left part 870 may also be moved downward.

Conversely, if the upper part of the shift lever 100 is moved to the right, the lower part of the shift lever 100 may be moved to the left. Accordingly, the select guide 260 may be rotated about the upper axis (the select axis 460) of the select guide 260, and the protrusion formed on the left part 870 of the select guide 260 may be moved upward. Consequently, the magnetization magnet holder 246 connected to the protrusion of the left part 870 may also be moved upward.

As described above, if the shift lever 100 is moved in the select direction 450 (to the right or left), the magnetization magnet holder 246 may move up or down. Accordingly, the magnetization pattern magnet 243 attached to the magnetization magnet holder 246 may move up or down.

If the magnetization pattern magnet 243 moves up or down, the three switch hall sensors 240 attached to the PCB 230 may recognize the polarity of the magnetization pattern magnet 243. If the shift lever 100 is positioned at the null 300, a signal representing the magnetization pattern of the magnetization pattern magnet 243 is (0,1,0) as illustrated in FIG. 9B.

For example, it may be assumed that a magnetization pattern is formed as illustrated in FIG. 8B and that the shift lever 100 is moved in the select direction 450. In this case, if the magnetization pattern magnet 243 moves downward, since the switch hall sensors 240 are fixed, they can recognize a magnetization pattern of an upper layer of the magnetization pattern magnet 243. In this case, a signal representing the magnetization pattern of the magnetization pattern magnet 243 is (0,0,1) as illustrated in FIG. 9A. In addition, it can be understood from the PCB 230 that the shift lever 100 is in the N, R or D position. Conversely, if the magnetization pattern magnet 243 moves upward, the signal representing the magnetization pattern of the magnetization pattern magnet 243 becomes (1,0,0) as illustrated in FIG. 9C. In addition, it can be understood that the shift lever 100 is in the M position.

Figure 9D:
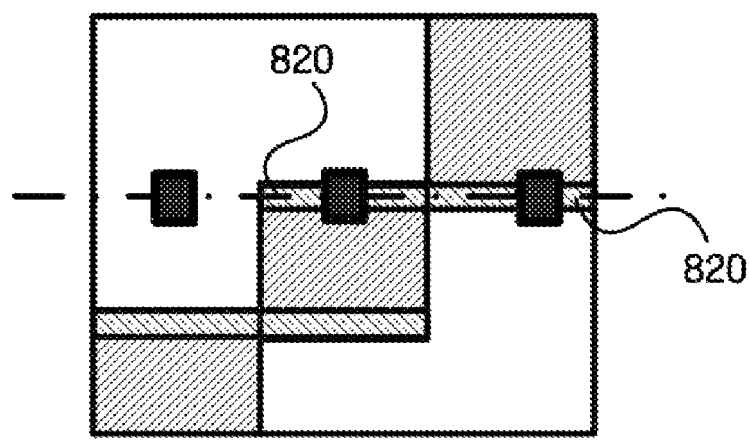
FIGS. 9D and 9E illustrate bit combinations recognized by the switch hall sensors of the second sensor unit in a buffer zone.
Figure 9E:
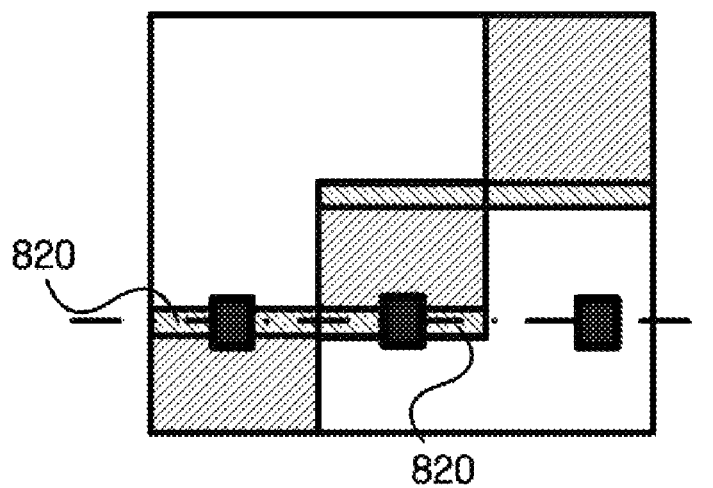

If the switch hall sensors 240 are not assembled in a linear form or if a magnetization pattern is not clear, the movement of the shift lever 100 may not be recognized using a signal representing the magnetization pattern. In order to reduce such a malfunction, a buffer zone 820 may be formed in the magnetization pattern as illustrated in FIGS. 9D and 9E. The buffer zone 820 prevents a plurality of bits sensed by the switch hall sensors 240 from being simultaneously changed even when the magnetization pattern magnet 243 moves up or down and guides the bits to be sequentially changed one by one, thereby reducing errors in bit signals.

FIGS. 9D and 9E illustrates bit combinations recognized by the switch hall sensors 240 of the second sensor unit in the buffer zone 820.

Referring to FIGS. 9D and 9E, if the shift lever 100 at the null position 300 is moved to the N, R or D position, a signal representing a magnetization pattern may be sequentially changed from (0,1,0) to (0,1,1) and then to (0,0,1). If the buffer zone 820 does not exist, the signal may be changed from (0,1,0) to (0,1,1), (0,0,0) or (0,0,1) and then to (0,0,1). Since a signal recognized as a noise can be input in the meantime, forming the buffer zone 820 at the boundary of layers of the magnetization pattern may be an effective way to remove the input signal. If the buffer zone 820 is formed, a change of the magnetization pattern at the boundary of the layers of the magnetization pattern can be clearly recognized, and thus the movement of the shift lever 100 can be effectively sensed.

Similarly, if the shift lever 100 at the null position 300 is moved to the M position, the signal may be sequentially changed from (0,1,0) to (1,1,0) and then to (1,0,0). When the buffer zone 820 does not exist, the signal may be changed from (0,1,0) to (0,1,1), (0,0,0), (1,0,1) or (1,1,0) and then to (1,0,0). When the buffer zone 820 is formed, the movement of the shift lever 100 can be accurately sensed regardless of production deviation.

FIGS. 10A, 10B, 10C, 10D, 10E and 10F illustrate signals sensed by the linear hall sensors 610 and the switch hall sensors 240 according to the movement of the electronic shift lever 100 according to an exemplary embodiment of the present invention.

Figure 10A:
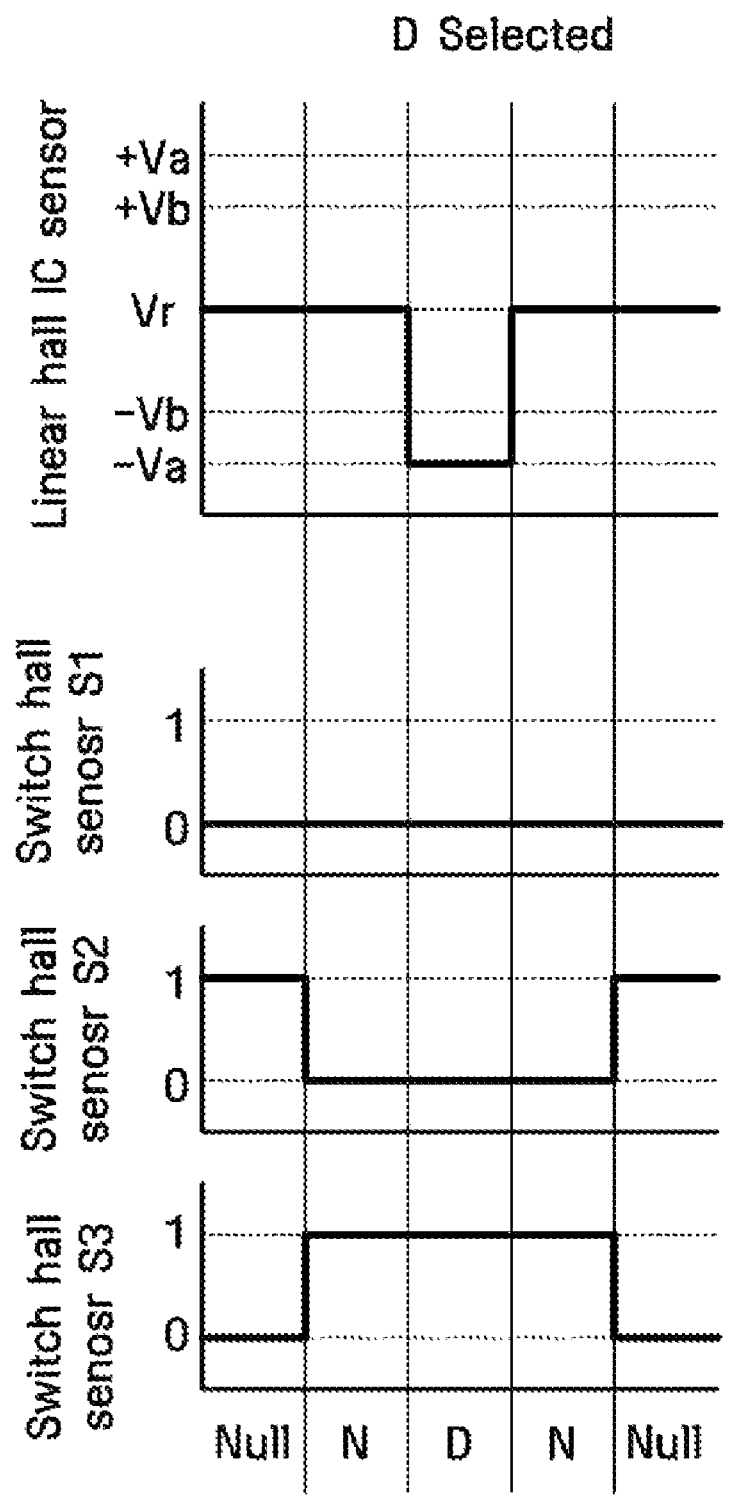
FIGS. 10A through 10F illustrate signals sensed by the linear hall sensors and the switch hall sensors according to the movement of the electronic shift lever according to an exemplary embodiment of the present invention.
Figure 10B:
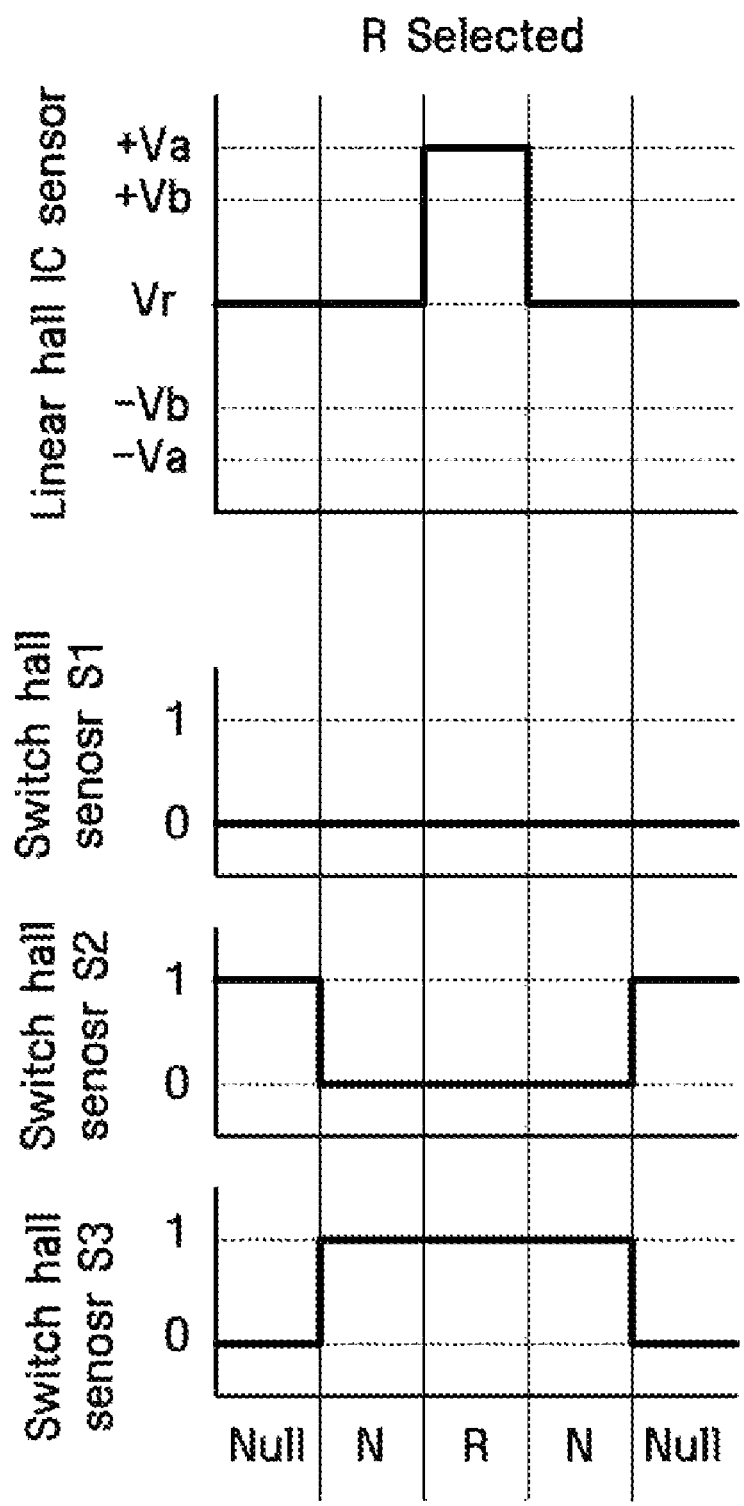

For example, if gear positions are arranged in a ⵆform as illustrated in FIG. 3, the linear hall sensors 610 can sense a voltage at the D position as shown in FIG. 10A. Similarly, since an angle is formed between the magnets 600 and the linear hall sensors 610 at the R position due to the movement of the shift lever 100, the linear hall sensors 610 can sense a voltage at the R position as shown in FIG. 10B. In this way, if the shift lever 100 is moved about the shift axis 420, the linear hall sensors 610 can sense a voltage at each gear position and thus identify whether the shift lever 100 is in the R, D, up (+), or down (−) position.

In addition, the switch hall sensors 240 may sense the movement of the shift lever 100 with respect to the select axis 460. Thus, the vertical and horizontal movements of the shift lever 100 can be determined by the signal obtained from the linear hall sensors 610 and the switch hall sensors 240.

Figure 10C:
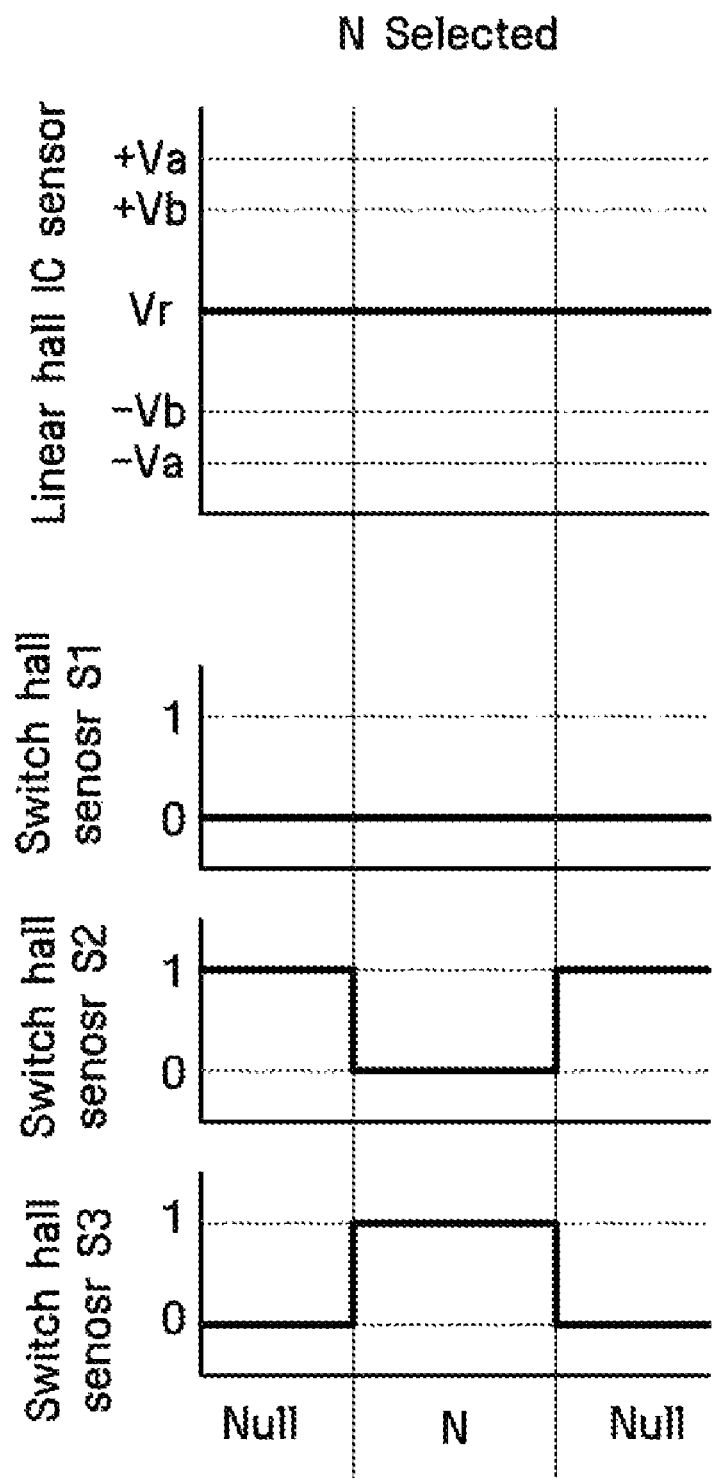
Figure 10D:
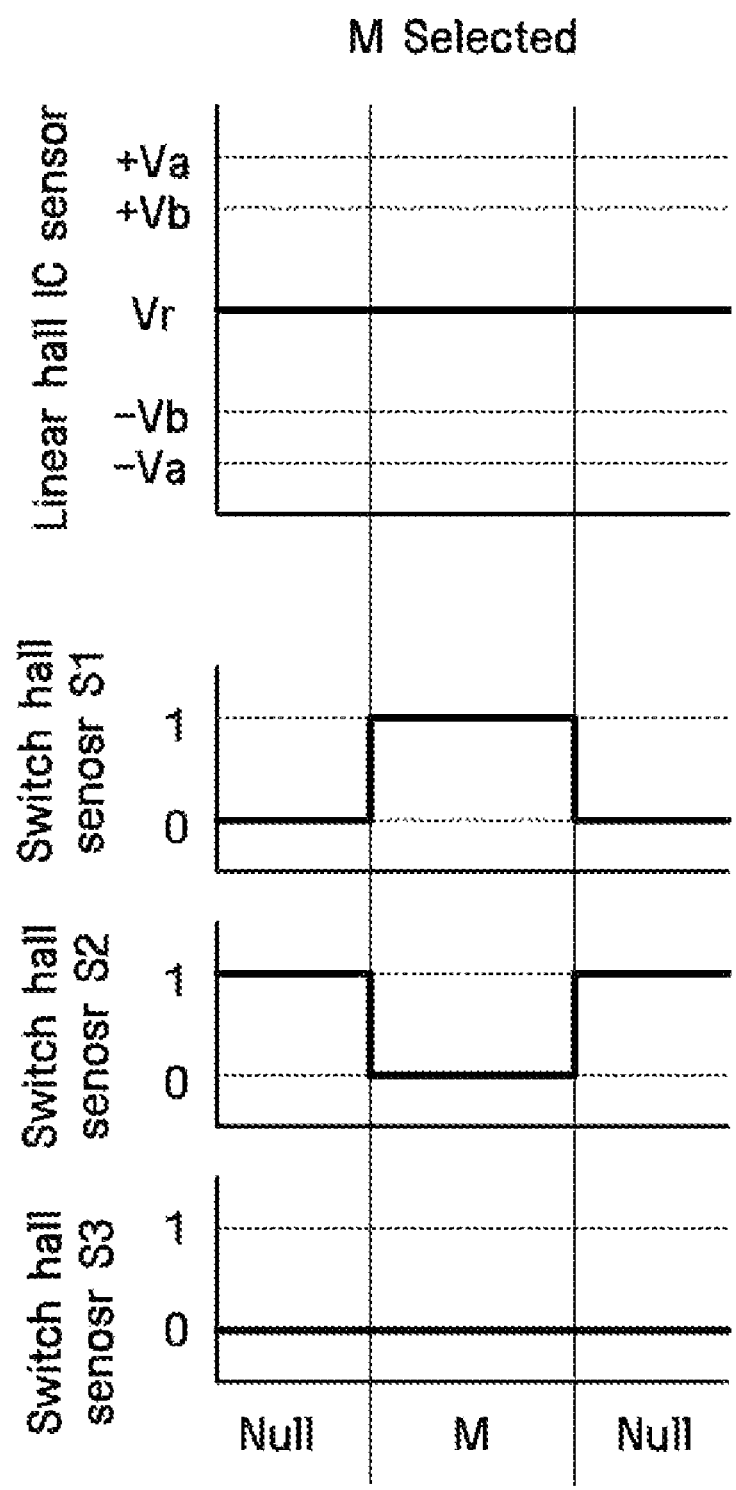
Figure 10E:
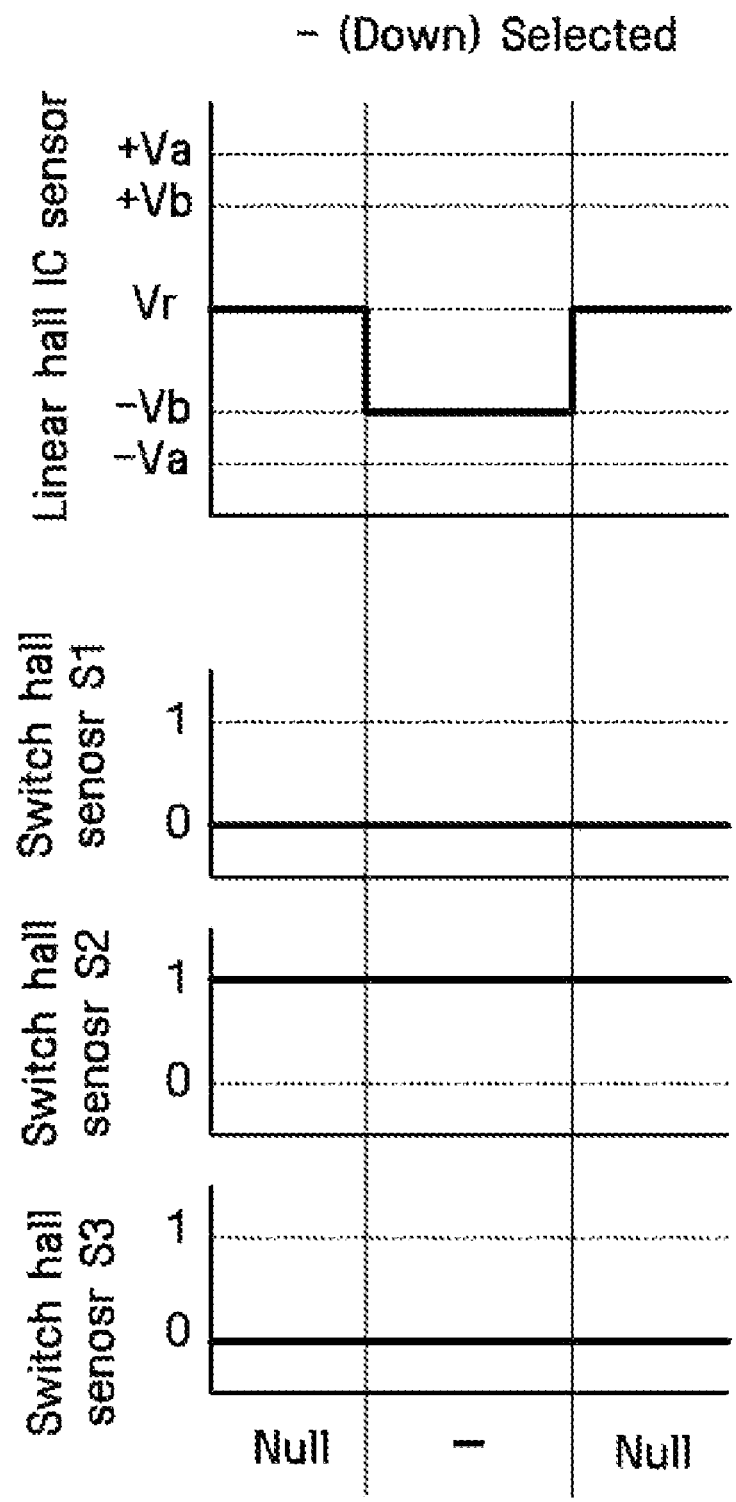

For example, if the switch hall sensors 240 are arranged as illustrated in FIGS. 10C and 10D, a signal sensed by the switch hall sensors 240 at the N position may be (0,0,1), and a signal sensed by the switch hall sensors 240 at the M position may be (1,0,0). Therefore, if the linear hall sensors 610 sense a voltage of approximately +Va and if a signal sensed by the switch hall sensors 240 is (0,0,1), the position of shift lever 100 may be recognized as R position as shown in FIG. 10B. That is, the position of the shift lever 100 with respect to the shift axis 420 is identified using the linear hall sensors 610, and the position of the shift lever 100 with respect to the select axis 460 is identified using the switch hall sensors 240. In order to identify the position of the shift lever 100 with respect to each axis, a response of each sensor may be independently sensed as described above. However, the position of the shift lever 100 can be relatively accurately and stably sensed by comprehensively considering signals generated by the linear hall sensors 610 and the switch hall sensors 240 in response to the movement of the shift lever 100.

After being manipulated, the shift lever 100 returns to the null position 300. Therefore, a signal may be generated at the null position 300 and terminated as a null signal. For example, if a user intends to move to the M position and then to a higher position. Firstly, the user may move the shift lever 100 to the M position. If the user lets go of the shift lever 100 in the M position, the shift lever 100 returns to the null position 300. Accordingly, as illustrated in 10D, a signal received by the linear hall sensors 610 moves from the null position 300 to the M position and then returns to the null position 300. If the linear hall sensors 610 receive this signal, they can sense that the shift lever 100 has moved to the M position.

Figure 10F:
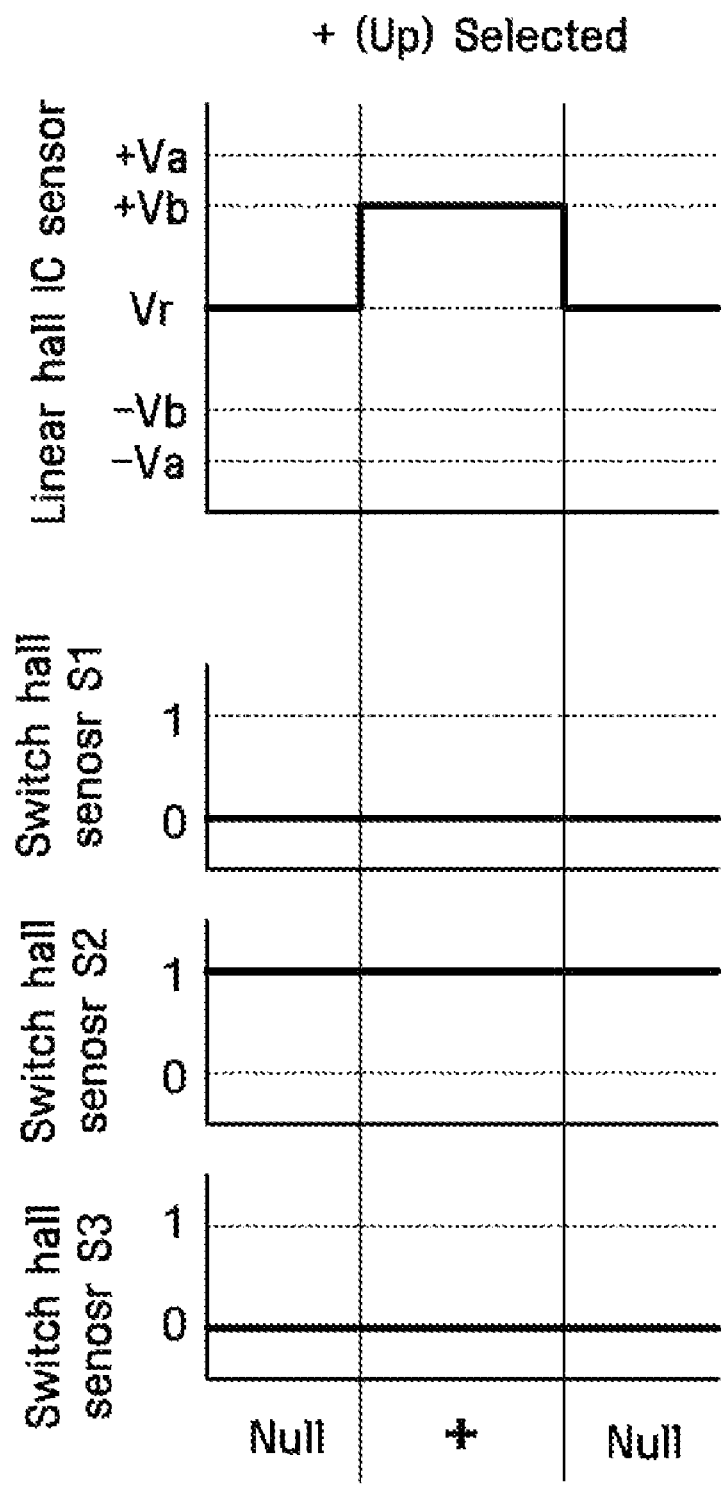

Next, if the user moves the shift lever 100 to the up (+) position and then lets go of the shift lever 100 in order to shift to a higher gear position, the linear hall sensors 610 sense a voltage of approximately +Vb at the up (+) position, and the switch hall sensors 240 sense a signal (0,1,0). However, the signal may be changed from a signal representing the null position 300 to a signal representing the up (+) position and then return to the signal representing the null position 300 as illustrated in FIG. 10F. Using this signal, it can be sensed that the shift lever 100 has moved to the up (+) position.

Since the linear hall sensors 610 sense a continuously changing value of this signal, the possibility of signal noise or error can be reduced. However, if the signal discontinuously jumps at a position where the polarity of a magnetization pattern is changed and if this jump occurs simultaneously in a plurality of switch halls, the PCB 230 receiving the signal may fail to accurately process the signal. When the buffer zone 820 is formed as illustrated in FIGS. 9D and 9E, such discontinuous changes of the signal can sequentially occur one by one. Therefore, the switch hall sensors 240 can show superior performance in sensing the signal.

By sensing the movement of a shift lever as described above, a gear position selected by a user can be identified. If information regarding the selected gear position is transmitted to a transmission included in a driving unit of a vehicle, the transmission may be operated. Here, the information may be transmitted to the transmission using a wired or wireless network.

According to the present invention, the movement of a shift lever in a shift direction and a select direction is sensed using (linear and switch) hall sensors. Therefore, a manual transmission mode as well as an automatic transmission can be selected.

Since a sensor unit sensing the rotation of the shift lever with respect to a shift axis and a select axis is implemented on a PCB, the number of parts can be reduced, and ease of assembly can be accomplished. Accordingly, defect rate of products can be reduced, and costs can be reduced. In addition, sensor reliability can be enhanced by attaching a plurality of sensors to the shift axis.

Since a plurality of linear hall sensors are used, the present invention can be prepared for a malfunction or breakdown of some of the linear hall sensors, and the position of the shift lever can be relatively accurately identified. Furthermore, since a buffer zone is formed in a magnetization pattern of a switch hall sensor unit, the movement of the shift lever can be stably and accurately sensed.

An electronic shift lever assembly according to the present invention is lighter than a conventional automatic gear transmission employing a method of driving a manual valve using cable tension. In addition, since the electronic shift lever assembly occupies less space, enhancing the efficiency of space utilization.

However, the effects of the present invention are not restricted to the one set forth herein. The above and other effects of the present invention will become more apparent to one of daily skill in the art to which the present invention pertains by referencing the claims.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in descriptive sense only and not for purposes of limitation.

What is claimed is:

1. An electronic shift lever assembly comprising:
a shift lever designed to be able to move so as to select a gear position;
a first sensor unit comprising magnets arranged in a cylindrical shape, a magnet holder to which the magnets are attached, and a plurality of linear hall sensors for sensing rotation of the magnets which is induced by movement of the magnet holder, thereby sensing vertical movement of the shift lever; and
a second sensor unit comprising a plurality of switch hall sensors for sensing horizontal movement of the shift lever,
wherein the second sensor unit comprises a magnet having a magnetization pattern and a magnet holder fixing the magnetization pattern magnet, and
wherein the plurality of switch hall sensors sense movement of the magnetization pattern magnet orthogonal to the vertical and horizontal movements of the shift lever.

2. The electronic shift lever assembly of claim 1, wherein the shift lever comprises:
a rod forming a body of the shift lever and rotating about the shift axis and the select axis;
a knob connected to the rod and functioning as a handle;
a shift guide guiding the shift lever so as to rotate about the shift axis; and
a select guide guiding the shift lever so as to rotate about the select axis.

3. The electronic shift lever assembly of claim 1, wherein the linear hall sensors lie on the opposite side of the magnets, and the magnets having a north (N) pole and a south (S) pole are contiguous to another magnet.

4. The electronic shift lever assembly of claim 1, wherein the first sensor unit further comprises a printed circuit board (PCB) having the linear hall sensors mounted thereon and receiving signals from the linear hall sensors.

5. The electronic shift lever assembly of claim 1, wherein the shift lever further comprises:
a detent bullet keeping the shift lever substantially vertical; and
an elastic member pushing the detent bullet downward so as to return the shift lever to a null position.

6. The electronic shift lever assembly of claim 1, wherein the magnetization pattern magnet is comprised of three layers, each layer having a magnetization pattern comprised of N and S poles.

7. The electronic shift lever assembly of claim 6, wherein a region in a diagonal direction of the magnetization pattern is comprised of an N pole, and other regions are comprised of the S pole.

8. The electronic shift lever assembly of claim 1, wherein the magnetization pattern is comprised of a plurality of layers and further comprises a buffer zone of the N or S pole in a region, in which polarity is changed, between the layers.

9. The electronic shift lever assembly of claim 1, wherein the second sensor unit further comprises a PCB having the switch hall sensors mounted thereon and receiving signals from the switch hall sensors.

10. The electronic shift lever assembly of claim 1, wherein a position of the shift lever is determined based on combination of signals sensed by the first sensor unit and the second sensor unit.

\* \* \* \* \*